US009826729B2

(12) United States Patent
Albaugh

(10) Patent No.: US 9,826,729 B2
(45) Date of Patent: Nov. 28, 2017

(54) MOUSE TRAP

(71) Applicant: William Albaugh, Tok, AK (US)

(72) Inventor: William Albaugh, Tok, AK (US)

( * ) Notice: Subject to any disclaimer, the term of this patent is extended or adjusted under 35 U.S.C. 154(b) by 170 days.

(21) Appl. No.: 14/962,650

(22) Filed: Dec. 8, 2015

(65) Prior Publication Data
US 2016/0157476 A1 Jun. 9, 2016

Related U.S. Application Data

(60) Provisional application No. 62/088,984, filed on Dec. 8, 2014.

(51) Int. Cl.
*A01M 23/04* (2006.01)
(52) U.S. Cl.
CPC .................................. *A01M 23/04* (2013.01)
(58) Field of Classification Search
CPC combination set(s) only.
See application file for complete search history.

(56) References Cited

U.S. PATENT DOCUMENTS

| 266,605 | A | * | 10/1882 | Bussard | A01M 23/04 43/69 |
| 1,095,613 | A | * | 5/1914 | Witt | A01M 23/04 43/69 |
| 1,151,438 | A | * | 8/1915 | Bowling | A01M 23/04 43/69 |
| 1,464,358 | A | * | 8/1923 | Gnoinsky | A01M 23/04 43/70 |
| 1,527,373 | A | * | 2/1925 | Nass | A01M 23/04 43/76 |
| 1,625,027 | A | * | 4/1927 | Hulse | A01M 23/04 43/61 |
| 2,221,406 | A | * | 11/1940 | Paiuk | A01M 23/04 43/72 |
| 2,825,995 | A | * | 3/1958 | Snider | A01M 23/06 43/69 |
| 4,241,531 | A | * | 12/1980 | Nelson | A01M 23/04 43/69 |
| 4,662,101 | A |  | 5/1987 | Fisher |  |
| 4,748,766 | A | * | 6/1988 | Stimac | A01M 23/04 43/69 |
| 5,115,595 | A | * | 5/1992 | Garcia | A01M 23/18 43/61 |

(Continued)

*Primary Examiner* — Christopher P Ellis
(74) *Attorney, Agent, or Firm* — Global Intellectual Property Agency, LLC; Daniel Enea

(57) ABSTRACT

A mouse trap device for non-lethally trapping mice and other rodents. The mouse trap includes a housing defining an interior volume, wherein the housing can resemble a building, rocket ship, or other decorative structure. The interior volume of the housing is accessed via an opening on a lower end thereof that allows a mouse to fit therethrough. A trapping structure having one or more sidewalls and an open upper end removably covered by a trap door is disposed within the housing, wherein the trapping structure is used to trap the mouse within an interior volume thereof. The mouse trap further includes a pathway and a platform, wherein the pathway leads a mouse to the platform that is disposed adjacent to the trap door. The platform can support bait thereon so as the mouse moves towards the bait, it will be required to step on the trap door and fall therethrough.

9 Claims, 4 Drawing Sheets

(56) References Cited

U.S. PATENT DOCUMENTS

| | | | | |
|---|---|---|---|---|
| 5,517,784 | A | * | 5/1996 | Sedore .................. A01M 23/10 43/64 |
| 5,720,126 | A | | 2/1998 | Lamb |
| 5,996,274 | A | * | 12/1999 | Smith .................... A01M 23/10 43/64 |
| 6,016,623 | A | | 1/2000 | Celestine |
| 6,212,819 | B1 | * | 4/2001 | Edwards ............... A01M 23/10 43/71 |
| 7,627,981 | B1 | | 12/2009 | Doster et al. |
| 2011/0138677 | A1 | * | 6/2011 | Jiao ....................... A01M 23/04 43/65 |
| 2015/0128480 | A1 | * | 5/2015 | Pinder .................. A01M 23/04 43/69 |

* cited by examiner

MOUSE TRAP

CROSS REFERENCE TO RELATED APPLICATION

This application claims the benefit of U.S. Provisional Application No. 62/088,984 filed on Dec. 8, 2014. The above identified patent application is herein incorporated by reference in its entirety to provide continuity of disclosure.

BACKGROUND OF THE INVENTION

The present invention relates to rodent trapping devices. More specifically, the present invention provides a mouse trap trapping a mouse or other rodent and concealing the trapping structure.

Mice and other rodents present a safety hazard when living in homes and businesses. Rodents carry diseases that spread through direct contact and fecal matter. Further, rodents can cause structural damage to buildings and objects located therein due to the ability of a rodent to chew through various materials. To rid a building of a rodent, many individuals resort to standard mouse traps, which are unsightly and leave a gruesome scene when a rodent is caught. Other mouse traps use deadly and dangerous poisons in order to lethally trap mice. Some people use non-lethal methods, such as adhesive paper, to trap a rodent, however, such methods require a user to view and contact the rodent in order to remove the same. Therefore, there exists a need in the prior art for a mouse trap that conceals the trapping structure and the rodent when caught.

SUMMARY OF THE INVENTION

In view of the foregoing disadvantages inherent in the known types of mouse traps now present in the prior art, the present invention provides a new mouse trap wherein the same can be utilized for providing convenience for the user when trapping a mouse or other rodent and concealing the trapping structure.

The mouse trap comprises a trapping structure concealed by a housing, wherein the housing resembles a decorative structure. The interior volume of the housing is accessed via an opening that allows a mouse to fit therethrough. A trapping structure having a lower wall, one or more sidewalls, and an open upper end removably covered by a trap door is disposed within the housing, wherein the trapping structure is used to trap the mouse within an interior volume thereof. The mouse trap further includes a pathway and a platform, wherein the pathway is configured to lead a mouse to the platform adapted to receive bait. The platform is disposed adjacent to the trap door, such that as the mouse moves towards the bait, it will be required to step on the trap door and fall therethrough.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
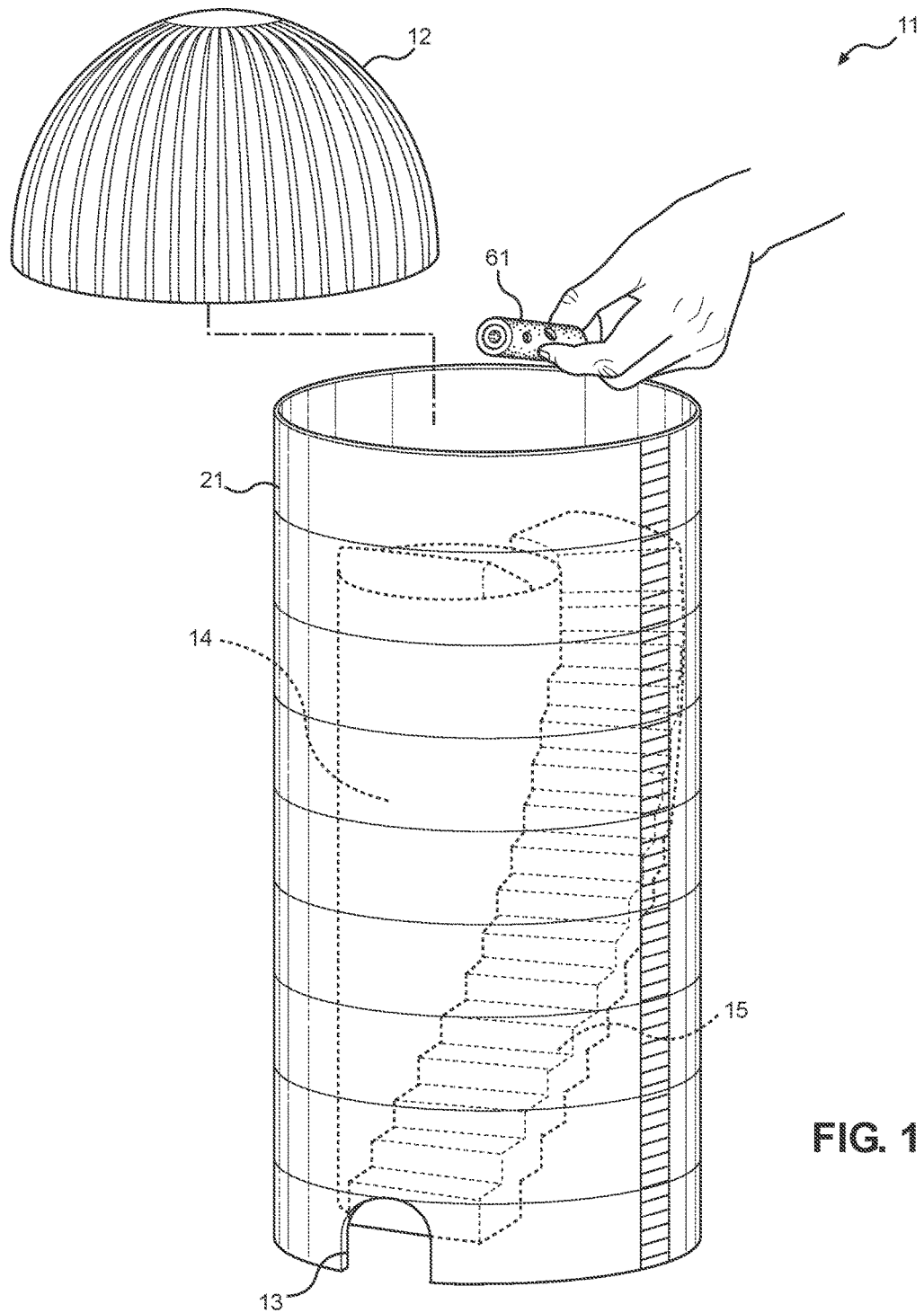
FIG. 1 shows a transparent view of an embodiment of the mouse trap.

Reference is made herein to the attached drawings. Like reference numerals are used throughout the drawings to depict like or similar elements of the mouse trap. For the purposes of presenting a brief and clear description of the present invention, the preferred embodiment will be discussed as used for trapping mice and other rodents while concealing the trapping structure. The figures are intended for representative purposes only and should not be considered to be limiting in any respect.

Referring now to FIG. 1, there is shown a transparent view of an embodiment of the mouse trap. The mouse trap 11 comprises a trapping structure 14 concealed by a housing 12. The housing 12 defining an interior volume, wherein the housing 12 resembles a decorative structure, such as a castle, rocket ship, among other various decorative structures. The interior volume of the housing 12 is configured to receive a mouse other small rodent therein. In the illustrated embodiment, the housing 12 resembles a silo having a cylindrical shaped body 21 and dome shaped top 22. The top 22 is removably attached to the body 21 via a fastener, such as mated threading, in order to allow rodent bait to be placed within the interior of the housing 12. In some embodiments the top 22 is pivotally attached to the body 21. In other embodiments, the housing 12 comprises an opening on the upper end thereof that would allow bait to be placed therethrough and, therefore, would not require a removable top.

Further, the housing 12 comprises an opening 13 configured to receive a mouse therethrough. In the illustrated embodiment, the opening 13 is U-shaped and disposed near the lower end of the housing 12 in order to provide access to the interior volume thereof. The mouse trap 11 further comprises a pathway 15 disposed within the housing 12, wherein the pathway 15 is used to allow a mouse to ascend towards the top of the trapping structure 14 to be contained therein via a non-lethal manner.

Figure 2:
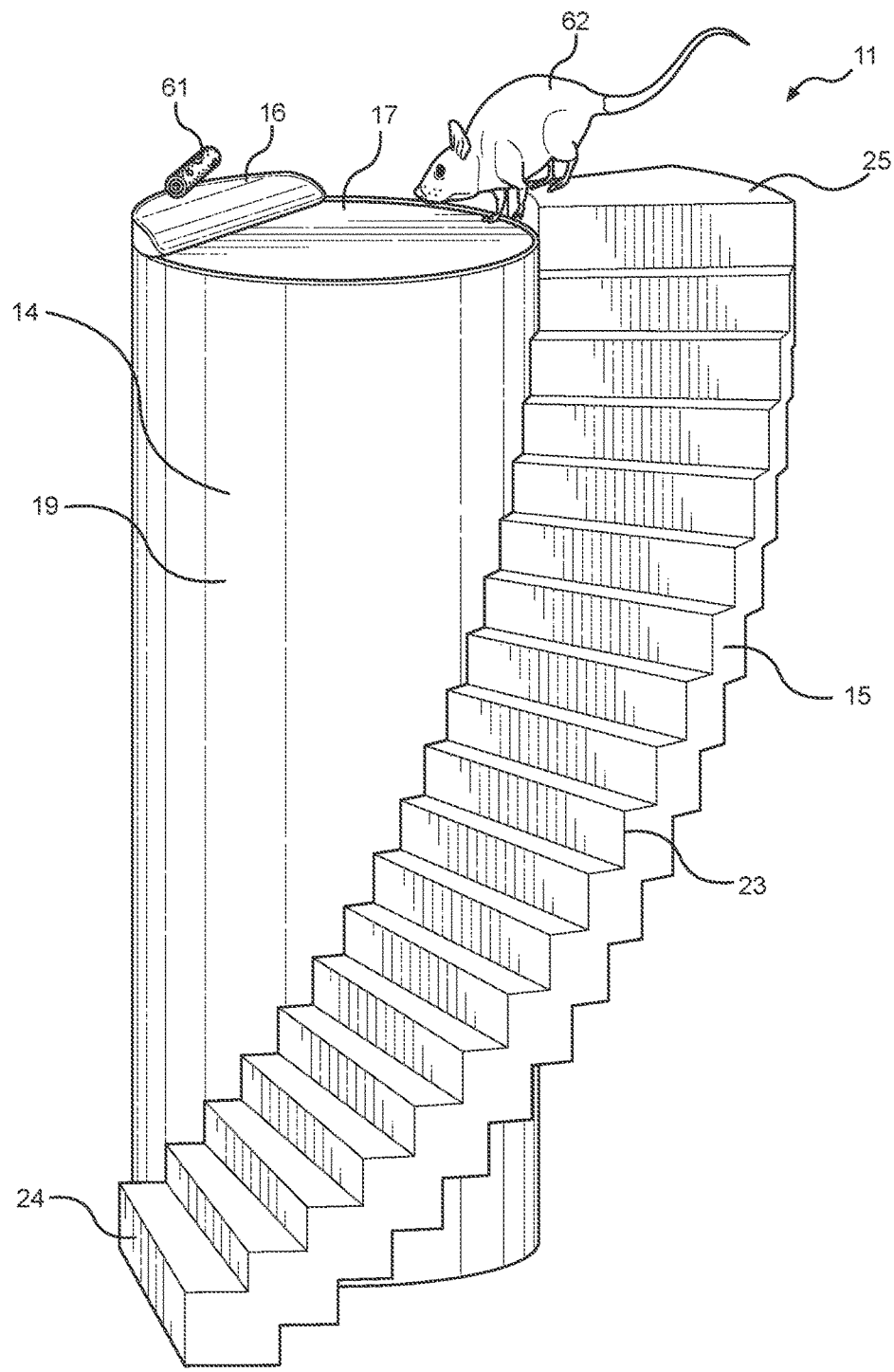
FIG. 2 shows a perspective view of the interior of the trapping structure of the mouse trap.

Referring now to FIG. 2, there is shown a perspective view of the interior of the housing of the mouse trap. The trapping structure 14 comprises a lower wall, one or more sidewalls 19, and an open upper end, defining an interior volume used to trap a mouse 62 or other small rodent therein. In the illustrated embodiment, the trapping structure 14 is substantially cylindrical in shape so as to correspond with the cylindrically shaped housing, albeit a smaller size than the housing so as to fit therein. The open upper end of the trapping structure 14 can receive a mouse 62 therethrough, wherein the mouse 62 will fall to the lower wall. The height of the sidewalls 19 of the trapping structure 14 are configured to prevent the mouse 62 from leaving the interior of the trapping structure 14. Further, the interior of the sidewalls 19 are preferably composed of a material that will not allow a mouse 62 to climb thereup, such as plastic or metal.

The open upper end of the trapping structure 14 is pivotally covered by a trap door 17. In the illustrated embodiment, the trap door 17 is hingedly secured to the upper end of the trapping structure 14 and configured to open towards the interior volume of the trapping structure 14 once a threshold weight is received thereon. Preferably, the threshold weight is substantially equal to the weight of a small rodent or mouse 62. The trap door 17 can be secured to the trapping structure 14 by any suitable fastener that allows the trap door 17 to automatically close, such as a spring loaded hinge.

A platform 16 is disposed over a portion of the upper end of the trapping structure 14, wherein the platform 16 is configured to receive and support bait 61 thereon. In the illustrated embodiment, the platform 16 comprises an elongated member with a planar lower surface, wherein the lower surface is attached to the edge of the upper end of the trapping structure 14 via a fastener, such as adhesive. In some embodiments, the platform 16 is removable and in other embodiments the platform 16 is integral to the trapping structure 14.

The mouse trap further includes a pathway 15 that allows a mouse to ascend to the top of the trapping structure 14. In the depicted embodiment, the pathway is a staircase comprising a plurality of steps 23, a lower end 24, and an upper end 25. In the illustrated embodiment, the pathway 15 is disposed within the housing and engaged with the exterior of the trapping structure 14. The lower end 24 of the pathway is disposed adjacent to the lower end of the housing so as to allow a mouse 62 to travel upwards onto the pathway 15 therefrom. The upper end 25 of the pathway 15 is connected to the upper end of the trapping structure 14. Preferably, the upper end 25 of the pathway 15 is disposed on an opposing side of the trapping structure 14 than that of the platform 16. Thus, the trap door 17 is positioned between the upper end 25 of the pathway 15 and the bait 61, such that when a mouse 62 attempts to retrieve the bait 61 it will first contact the trap door 17 prior to reaching the bait 61 on the platform 16. In the illustrated embodiment, an interior side of the pathway 15 is secured to the sidewall 19 of the trapping structure 14 via a fastener, such as adhesive. Further, the vertical length of the pathway 15 is substantially the same vertical length of that of the sidewalls 19 of the trapping structure 14 in order to allow a mouse 62 to climb from the lower end thereof to the upper end thereof. However, in alternate embodiments, the pathway 15 comprises any suitable configuration, such as a ramp, that enables a mouse 62 to travel from the opening of the housing to the upper end of the trapping structure 14 via the pathway 15.

Figure 3:
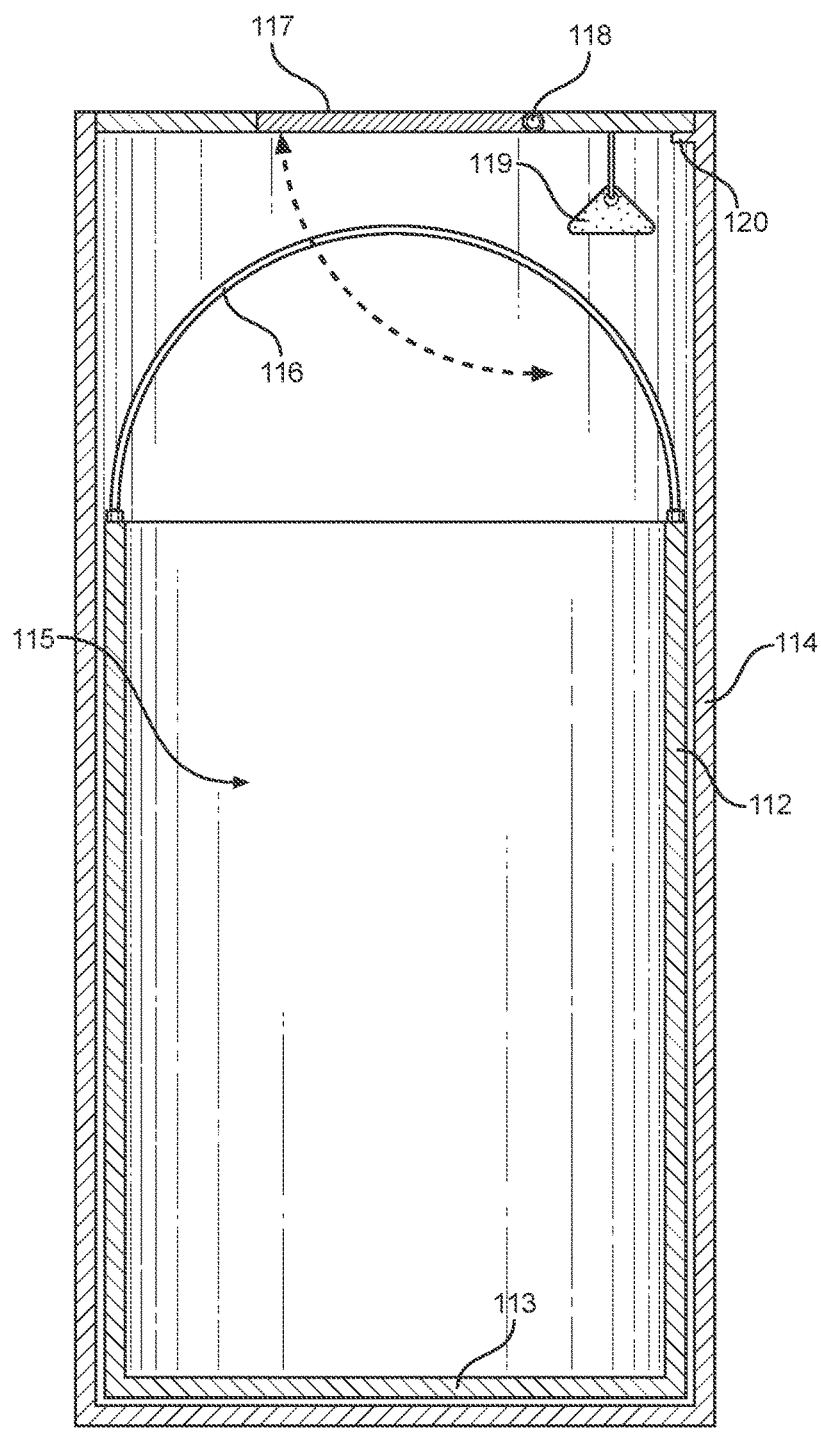
FIG. 3 shows a cross sectional view of the removable container of the mouse trap positioned within the trapping structure.

Referring now to FIG. 3, there is shown a cross sectional view of the removable container of the mouse trap positioned within the trapping structure. In some embodiments, a removable container 112 is disposed within the interior volume of the trapping structure 114, such that when a mouse falls through the open upper end thereof, it will be contained within the removable container 112. The removable container 112 comprises a lower wall 113, one or more sidewalls, and an open upper end, defining an interior volume 115. The removable container 112 is configured to receive a rodent or mouse therein. Preferably, the width of the removable container 112 is substantially the same to that of the trapping structure 114 so that the container can rest flush against the interior sidewalls of the trapping structure 114. In the illustrated embodiment, the removable container 112 comprises a handle 116 so as to allow the removable container 112 to be easily removed from the trapping structure 114. The handle 116 is configured to rest against a sidewall of the trapping structure 114 or removable container 112 so as to not obstruct a mouse falling within the container 112.

In some embodiments, the trap door 117 comprises a weight mechanism that allows a user to select the threshold weight that must be received on the trap door 117 for the trap door 117 to open. The weight mechanism further allows the trap door 117 to automatically close after the weight of the mouse has triggered the door 117 to open. In the illustrated embodiment, the trap door 117 comprises a hinge 118 disposed between a first portion and a second portion of the door 117. The first portion of the trap door 117 is positioned adjacent to the pathway. One or more weights 119 are secured to the underside of the first portion of the door 117. A lip 120 extends from the upper end of the trapping structure 114 so as to prevent the trap door 117 from opening on the side in which the weight 119 is disposed. As a mouse steps over the hinge 118 and onto the second portion of the trap door 117, the trap door 117 opens and the mouse falls into the removable container 112. The weight 119 disposed on the first portion serves to lift the second portion back to a horizontal position so the trap door 117 automatically closes.

Figure 4:
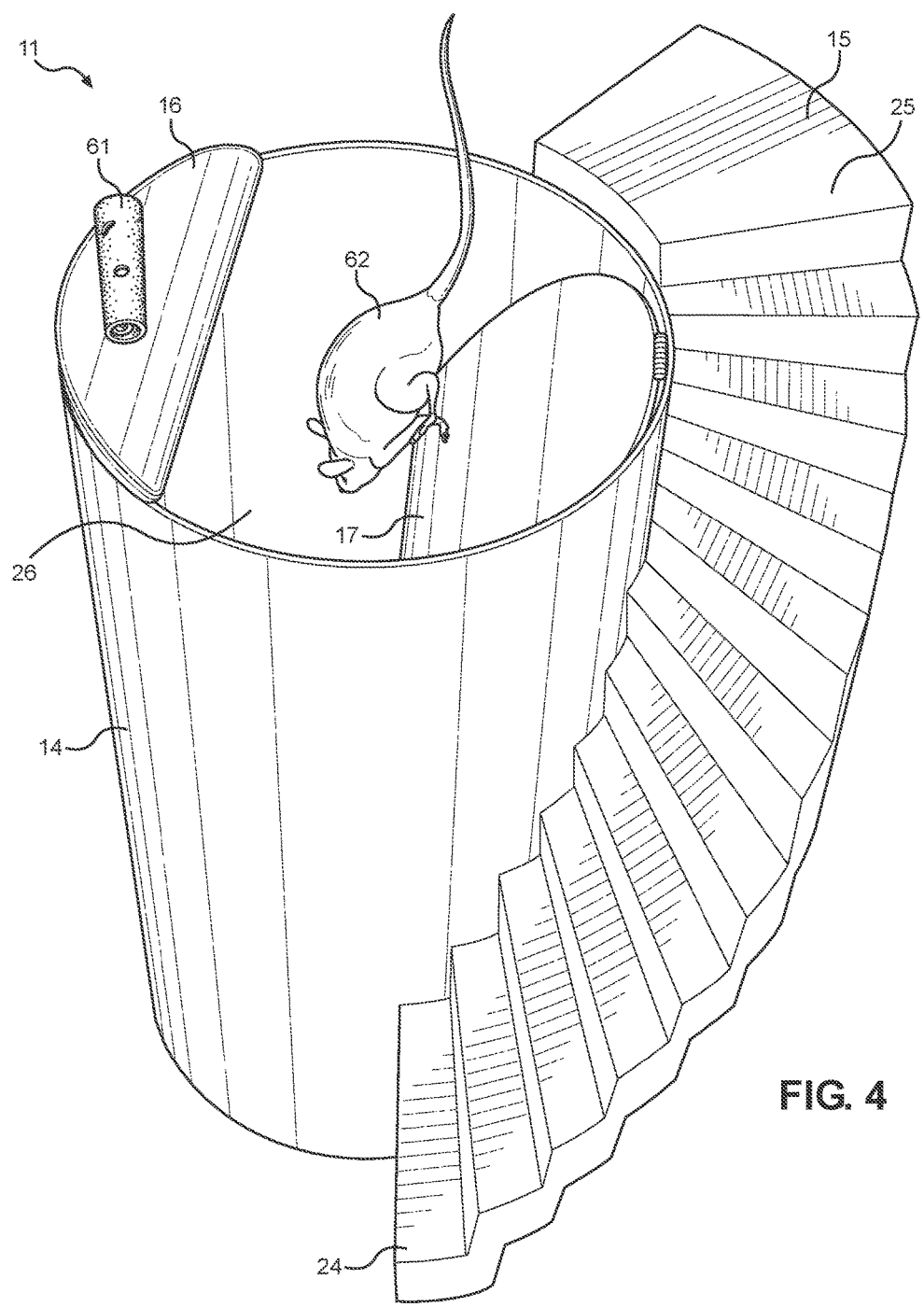
FIG. 4 shows a perspective view of the trap door of the trapping structure of the mouse trap.

Referring now to FIG. 4, there is shown a perspective view of the trap door of the trapping structure of the mouse trap. In operation, the dome top of the housing is lifted in order for rodent bait 61 to be placed on the platform 16 of the trapping structure 14. The bait 61 attracts the mouse 62 thereto. A mouse 62 or other small rodent enters the housing through the opening. The mouse 62 climbs from the lower end 24 of the pathway 15 to the upper end 25 thereof in order to access bait 61 positioned on the platform 16 of the trapping structure 14. Once the mouse 62 reaches the upper end 25 of the pathway 15, it attempts to access the bait 61 by stepping onto the trap door 17 over the open upper end 26 of the trapping structure 14. Due to the positioning of the trap door 17 between the platform 16 and the upper end 25 of the pathway 15, the mouse 62 will fall into the interior 26 of the trapping structure 14 once it steps onto the trap door 17 and the trap door 17 opens. A user may remove the dome top of the housing and release the mouse 62 from the trapping structure 14 in a preferable location once the mouse 62 has been trapped by the mouse trap. The mouse trap can be displayed within a home or business due to the decorative exterior and the concealment of the mouse and trapping structure disposed within the housing.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mouse trap, comprising:
   a housing defining an interior volume;
   an opening disposed on the housing, wherein the opening is configured to allow a mouse to enter the interior volume of the housing;

a trapping structure disposed within the housing, wherein the trapping structure comprises a lower wall, one or more sidewalls, and an open upper end, defining an interior volume;

a platform disposed adjacent to the open upper end of the trapping structure and configured to support bait thereon;

a trap door pivotally secured to the open upper end of the trapping structure and configured to open when the mouse is positioned thereon;

a pathway disposed within the housing, adjacent to the trapping structure, wherein the pathway extends between the opening and the open upper end of the trapping structure.

2. The mouse trap of claim 1, wherein the housing comprises a cylindrical body and a dome shaped top, configured to correspond in appearance to a silo.

3. The mouse trap of claim 2, wherein the dome shaped top is removably attached to the cylindrical body via a fastener.

4. The mouse trap of claim 1, wherein the pathway wraps around an exterior of the one or more sidewalls of the trapping structure.

5. The mouse trap of claim 1, wherein the trapping structure comprises a circular cross section.

6. The mouse trap of claim 1, wherein the pathway and the trapping structure comprise the same vertical length.

7. The mouse trap of claim 1, wherein the pathway comprises a staircase having a plurality of steps.

8. The mouse trap of claim 1, wherein the trap door comprises a first portion, a second portion, and a hinge disposed therebetween and attached to the trapping structure so as to allow the trap door to pivot;

a lip extending inward from an upper end of the trapping structure and configured to receive the first portion of the trap door thereon;

wherein the first portion comprises one or more weights so as to allow the trap door to automatically close.

9. The mouse trap of claim 1, further comprising a removable container having a lower wall, one or more sidewalls, and an open upper end, wherein the removable container is removably disposed within the trapping structure and configured to receive a mouse therein.

* * * * *